United States Patent
Teshima et al.

(10) Patent No.: US 7,663,508 B2
(45) Date of Patent: Feb. 16, 2010

(54) VEHICLE LOCATION INFORMATION NOTIFYING SYSTEM

(75) Inventors: Kentarou Teshima, Kariya (JP); Kazuhiro Nakashima, Kariya (JP); Kenichi Ogino, Toyota (JP)

(73) Assignee: DENSO Corporation, Kariya (JP)

(*) Notice: Subject to any disclaimer, the term of this patent is extended or adjusted under 35 U.S.C. 154(b) by 108 days.

(21) Appl. No.: 11/808,455

(22) Filed: Jun. 11, 2007

(65) Prior Publication Data
US 2007/0290819 A1  Dec. 20, 2007

(30) Foreign Application Priority Data
Jun. 19, 2006 (JP) .............................. 2006-169117

(51) Int. Cl.
*G08G 1/123* (2006.01)
(52) U.S. Cl. ............... 340/988; 340/539.1; 340/989; 340/990; 340/425.5; 340/539.11; 340/539.13; 340/539.23
(58) Field of Classification Search ............... 340/988, 340/989, 990, 425.5, 426.13, 539.1, 539.11, 340/539.13, 539.23
See application file for complete search history.

(56) References Cited

U.S. PATENT DOCUMENTS

| | | | | |
|---|---|---|---|---|
| 5,721,550 A | * | 2/1998 | Lopez | 341/176 |
| 6,392,592 B1 | * | 5/2002 | Johnson et al. | 342/357.07 |
| 6,407,698 B1 | * | 6/2002 | Ayed | 342/357.07 |
| 6,522,027 B1 | * | 2/2003 | Morillon et al. | 307/10.3 |
| 6,529,131 B2 | * | 3/2003 | Wentworth | 340/573.1 |
| 6,529,142 B2 | * | 3/2003 | Yeh et al. | 340/988 |

FOREIGN PATENT DOCUMENTS

| | | |
|---|---|---|
| JP | 2004-019334 | 1/2004 |
| KR | 1998-020398 | 6/1998 |
| KR | 10-2005-0090585 | 9/2005 |
| KR | 2005-0090585 | 9/2005 |
| KR | 2005-90585 A | 9/2005 |

OTHER PUBLICATIONS

Korean Office Action dated Sep. 18, 2008 issued in counterpart Korean Application 9-5-2008-048215228 with English translation.
Office Action issued Mar. 23, 2009 in corresponding Korean Application No. 10-2007-0059390 and an at least partial English language translation thereof.

(Continued)

*Primary Examiner*—Daryl Pope
(74) *Attorney, Agent, or Firm*—Nixon & Vanderhye P.C.

(57) ABSTRACT

When searching of a location of a vehicle is commanded, a vehicle search signal is transmitted from a portable device. The vehicle search signal includes an ID code of the portable device. When a vehicle side communication unit receives the valid ID code, the vehicle side communication unit transmits a vehicle side response signal to the portable device. The portable device computes a distance from the portable device to the vehicle based on a signal level of the received vehicle side response signal. A notifying device notifies the computed distance.

18 Claims, 4 Drawing Sheets

U.S. PATENT DOCUMENTS

| | | | |
|---|---|---|---|
| 6,580,368 B1* | 6/2003 | Jacobs | 340/539.11 |
| 6,873,257 B2* | 3/2005 | Maloney et al. | 340/539.21 |
| 2003/0214403 A1* | 11/2003 | Lam et al. | 340/539.13 |
| 2004/0183676 A1* | 9/2004 | Eisenman | 340/539.13 |
| 2006/0046684 A1* | 3/2006 | Kameyama | 455/345 |
| 2006/0111835 A1* | 5/2006 | Baker et al. | 701/207 |
| 2007/0126603 A1* | 6/2007 | Driscoll et al. | 340/988 |
| 2008/0167806 A1* | 7/2008 | Wheeler et al. | 701/208 |

OTHER PUBLICATIONS

Korean Notice of Invitation to Submit Opinion dated Feb. 28, 2008 issued in counterpart Korean Application 10-2007-0059390 with English translation.

* cited by examiner

VEHICLE LOCATION INFORMATION NOTIFYING SYSTEM

CROSS REFERENCE TO RELATED APPLICATION

This application is based on and incorporates herein by reference Japanese Patent Application No. 2006-169117 filed on Jun. 19, 2006.

BACKGROUND OF THE INVENTION

1. Field of the Invention

The present invention relates to a vehicle location information notifying system that includes a portable device and a vehicle side communication unit, which perform intercommunication therebetween to enable the portable device to obtain and notify vehicle location information.

2. Description of Related Art

For example, when a vehicle is parked in a huge parking space, such as a parking space of a large shopping mall or of a large department store, a user of the vehicle often cannot remember the parked location of the vehicle after shopping. Therefore, the user needs to spend wasteful time trying to find his/her vehicle before finally finding it.

For example, Japanese Unexamined Patent Publication No. 2004-19334 discloses a keyless system, which unlocks doors of a vehicle upon operation of a switch provided in a vehicle key and at the same time provides a notification by flashing of hazard lamps or by voice message. Thus, through use of the flashing of the hazard lamps, the keyless system permits the user to find his/her vehicle.

However, at the time of flashing the hazard lamps, if the vehicle is out of his/her eyesight, the user cannot find the vehicle.

SUMMARY OF THE INVENTION

The present invention is made in view of the above disadvantage. Thus, it is an objective of the present invention to provide a vehicle location information notifying system, which permits a user of a vehicle to more easily find his/her vehicle.

To achieve the objective of the present invention, there is provided a vehicle location information notifying system, which includes a vehicle side communication unit and a portable device. The vehicle side communication unit is installed in a vehicle. The portable device is carriable by a user and performs first intercommunication with the vehicle side communication unit. The portable device includes a location information obtaining means and a notifying means. The location information obtaining means is for obtaining location information of the vehicle, which has the vehicle side communication unit, through the first intercommunication. The notifying means is for notifying the location information of the vehicle.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A vehicle location information notifying system according to a first embodiment of the present invention will be described with reference to the accompanying drawings. The vehicle location information notifying system of the present embodiment includes a smart key (a portable device) and a vehicle side communication unit of a smart key system. The smart key enables locking and unlocking of each door lock of a vehicle without using a physical key.

Figure 1:
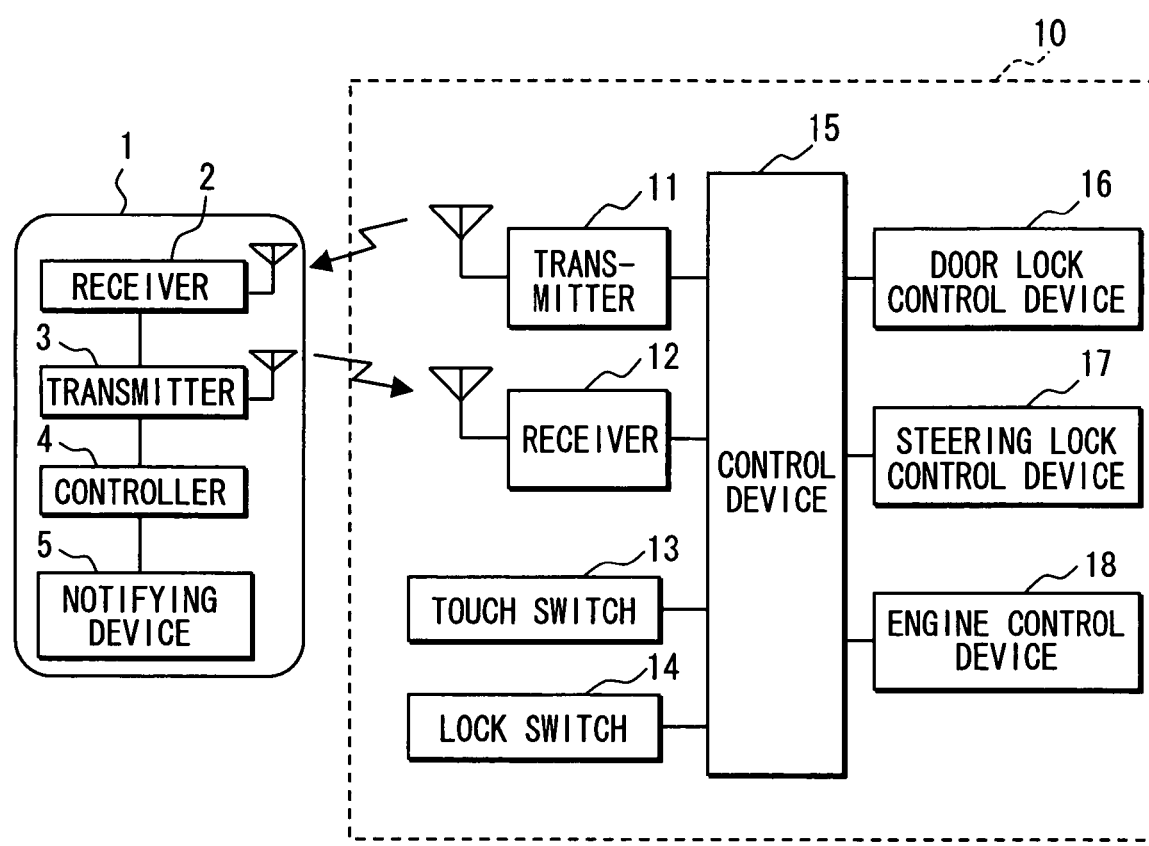
FIG. 1 is a schematic diagram showing an entire structure of a vehicle location information notifying system according to a first embodiment of the present invention.

FIG. 1 shows a schematic structure of the vehicle location information notifying system (the smart key system). As shown in FIG. 1, the vehicle 10 includes transmitters 11, a receiver 12 and a control device 15, which form a vehicle side communication unit. FIG. 1 shows only one of the multiple transmitters 11. However, in reality, the multiple transmitters 11 are provided to respective doors and a passenger compartment of the vehicle 10. The transmitters 11 transmit a request signal and a vehicle side response signal based on a transmission command signal received from the control device 15.

For example, in a state where the vehicle 10 is parked upon turning off of an engine and locking of the respective doors, the control device 15 commands the corresponding transmitters 11, which are provided to the doors and are designed to transmit the request signal out of the passenger compartment, to send the request signal at predetermined time intervals. At this time, an output power of each transmitter 11 is adjusted to have about 1 m of a transmittable range of the request signal. Therefore, when a carrier (i.e., a user) who carries the portable device 1 enters this transmittable range, the portable device 1 outputs a response signal in response to the request signal outputted from the corresponding transmitter 11, so that the approach of the carrier of the portable device 1 to the vehicle 10 can be sensed.

The signal transmission power of the transmitter 11 is selectable from at least two levels. When the carrier of the portable device 1 is searching a location of his/her vehicle 10, the level of the signal transmission power of the transmitter 11 is increased in response to a command received from the control device 15 to transmit a vehicle side response signal to the portable device 1. In such a case, the signal transmission power of the transmitter 11 is increased to have about several hundreds of meters of the transmittable range of the vehicle side response single from the transmitter 11. In the following description, long distance intercommunication between the vehicle side communication unit and the portable device 1 at a long communication range will be referred to as "first intercommunication", and short distance intercommunication between the vehicle side communication unit and the portable device 1 will be referred to as "second intercommunication".

Here, instead of providing the transmitters 11, each of which can execute both of the first communication and the second communication, it is possible to provide dedicated transmitters 11, which are dedicated to execute only the first intercommunication with the portable device 1, and other dedicated transmitters 11, which are dedicated to execute only the second intercommunication with the portable device 1. Furthermore, a signal frequency range for the first intercommunication and a signal frequency range for the second intercommunication may be separated from each other. Specifically, in the case of the second intercommunication where the intercommunication is executed within a narrow area around the vehicle 10, a relatively low frequency range may be used. In contrast, in the case of the first intercommunication where the intercommunication is executed within a wide area around the vehicle 10, a relatively high frequency range may be used. In this way, the communication range from the vehicle 10 can be more effectively increased in the case of the first intercommunication. However, in such a case, a receiver 2 of the portable device 1 should be designed to enable the change of the receiving signal frequency, or alternatively multiple receivers, which have different receiving signal frequencies, respectively, should be provided.

The receiver 12 of the vehicle side communication unit is provided in the passenger compartment of the vehicle 10 to receive, for example, the response signal and the vehicle search signal transmitted from the portable device 1. The signals, which are received by the receiver 12, are outputted as received signals from the receiver 12 to the control device 15. The control device 15 determines whether a received ID code, which is contained in each corresponding received signal, satisfies a predetermined relationship, such as consistency of the received ID code with a corresponding registered ID code, which has been preregistered (identification of the ID code).

The portable device 1 includes the receiver 2, a transmitter 3, a controller 4 and a notifying device 5. The receiver 2 receives the request signal from the transmitter 11 of the vehicle side communication unit. The transmitter 3 transmits the response signal, which includes the ID code, in response to the reception of the request signal at the receiver 2. The controller 4 is connected with the receiver 2 and the transmitter 3 and executes various control processes. Specifically, the controller 4 determines whether the request signal has been received based on the received signal of the receiver 2. Also, in response to the received request signal, the controller 4 generates the response signal, which includes the ID code of the portable device 1, and commands the transmitter 3 to transmit the generated response signal.

The portable device 1 further includes an undepicted manipulation arrangement (e.g., a manipulation key arrangement, a manipulation switch arrangement or a touch panel), through which the carrier of the portable device 1 enters a command for searching the vehicle location. When the vehicle location search is commanded by the carrier of the portable device 1, the controller 4 increases the single transmission power of the transmitter 3 and transmits a vehicle search signal through the transmitter 3. The vehicle search signal includes the ID code of the portable device 1. When the vehicle side communication unit receives the vehicle search signal, which includes the ID code that matches with the corresponding registered ID code, the vehicle side communication unit returns a vehicle side response signal to the portable device 1.

Then, the controller 4 determines whether the receiver 2 has received the vehicle side response signal. When the controller 4 determines that the receiver 2 has received the vehicle side response signal, the controller 4 computes a distance from the portable device 1 to the vehicle 10 based on a signal level of the received vehicle side response signal. Specifically, the signal level of the received vehicle side response signal at the portable device 1 changes in response to the distance between the portable device 1 and the vehicle side communication unit. Therefore, it is possible to compute the distance from the portable device 1 to the vehicle 10, which has the vehicle side communication unit, based on the signal level of the received vehicle side response signal.

The notifying device 5 is implemented by a buzzer, which outputs sound. Specifically, the notifying device 5 generates notification sound for notifying the computed distance, which is computed by the controller 4. For example, when the distance from the portable device 1 to the vehicle 10 becomes a predetermined distance, the controller 4 operates the notifying device 5 to generate the notification sound or to change a sound pattern and/or sound tone of the notification sound for each of predetermined distance ranges.

Furthermore, the portable device 1 may be configured to command the start and end of the search operation for searching the vehicle location and to periodically send the vehicle search signal from the start to the end of the search operation. In such a case, intervals of generation of the notification sound may be changed based on the change in the distance from the portable device 1 to the vehicle 10 computed based on the signal level of the received vehicle side response signal. Specifically, when the distance from the portable device 1 to the vehicle 10 is increased, the intervals of the generation of the notification sound may be lengthened, and vice versa. In this way, in addition to the distance from the portable device 1 to the vehicle 10, the carrier of the portable device 1 can recognize a direction of the location of the vehicle 10 based on the change in the notification sound (i.e., can recognize whether the carrier of the portable device 1 is approaching the vehicle 10 or moving away from the vehicle 10).

The notifying device 5 of the portable device 1 may be a lighting device, such as an LED, which emits light or may be a vibrator, which generates vibration, so that the distance from the portable device 1 to the vehicle 10 can be notified to the carrier of the portable device 1 having the notifying device 5 through use of the light or vibration. When the portable device 1 is configured to notify the distance to the vehicle 10 through use of the sound, light or vibration, the structure of the portable device 1 can be simplified, allowing a reduction in the size of the portable device 1.

A touch switch 13 is provided to a door handle of each door of the vehicle 10. When the carrier of the portable device 1 touches the door handle, the touch switch 13 outputs a signal to notify the touching of the door handle by the carrier of the portable device 1. Furthermore, a lock switch 14 of a push type is provided to the door handle. When it is determined that the ID code is valid at the outside of the passenger compartment upon the operation of the lock switch 14, each door is locked.

Furthermore, a door lock control device 16 is provided to each door of the vehicle 10 to lock and unlock the door. The door lock control device 16 is operated based on a command signal received from the control device 15.

For example, when the carrier of the portable device 1 approaches the parked vehicle 10, the control device 15 verifies the ID code of the portable device 1 with a preregistered code of the ID code. At this time, if the control device 15 determines that the ID code of the portable device 1 is valid upon the verification, the control device 15 supplies electric current to the touch switch 13 of the door handle to activate the touch switch 13. Thus, the touch switch 13 can sense the touching of the carrier of the portable device 1 to the door handle. When the touching of the carrier of the portable device 1 to the door handle is sensed through the touch switch 13, the control device 15 commands each door lock control device 16 to unlock all of the door locks. In this way, the carrier of the portable device 1 can unlock the door locks and can get into the passenger compartment without use of a vehicle key.

When the carrier of the portable device 1 operates the lock switch 14, which is provided to the door handle, to lock the door lock, a request signal is transmitted from the transmitter 11 to the interior and exterior of the passenger compartment. At this time, in a case where the portable device 1 is located inside the passenger compartment, a response signal is not returned from the portable device 1 in response to the request signal transmitted to the interior of the passenger compartment. In contrast, in a case where the portable device 1 is located outside the passenger compartment, the response signal is returned from the portable device 1 in response to the request signal transmitted to the exterior of the passenger compartment. At this time, if the ID code of the portable device 1 is determined to be valid, it is then determined that the portable device 1 is carried by the carrier who is now outside the passenger compartment. In such a case, in response to the operation of the lock switch 14 by the carrier of the portable device 1, the control device 15 outputs a command signal to each door lock control device 16 to lock the corresponding lock.

Furthermore, according to the present embodiment, a steering lock control device 17 and an engine control device 18 are provided to improve the security of the vehicle 10. The steering lock control device 17 turns on and turns off a steering lock based on a corresponding command signal from the control device 15. Also, the engine control device 18 enables and disables cranking of the engine of the vehicle 10 based on a corresponding command signal from the control device 15.

Specifically, when the carrier of the portable device 1 opens the door and gets into the passenger compartment of the vehicle 10, the control device 15 performs the intercommunication with the portable device 1 through use of the transmitter 11 and the receiver 12 and verifies the ID code of the portable device 1 once again. When an engine switch, which is provided in the passenger compartment, is operated by the carrier of the portable device 1, the steering lock control device 17 asks the control device 15 whether unlocking of the steering lock should be enabled. If the ID code of the portable device 1 has been already validated, the control device 15 responds to the steering lock control device 17 by permitting the unlocking of the steering lock. Based on this response, the steering lock control device 17 unlocks the steering lock. Simultaneously, the control device 15 outputs a command signal to the engine control device 18 to enable the cranking of the engine.

If the ID code of the portable device 1 is determined to be invalid, the steering lock control device 17 maintains the locking of the steering lock, and the engine control device 18 maintains the disabled state of the cranking of the engine. Therefore, when an unauthorized person who does not have the portable device 1 tries to start the engine of the vehicle 10 and to drive the vehicle 10, such an action of the unauthorized person can be advantageously prevented.

Furthermore, when the carrier of the portable device 1 operates the lock switch 14, the control device 15 commands each door lock control device 16 to lock the door locks and also commands the steering lock control device 17 to lock the steering lock. Also, at the same time, the control device 15 commands the engine control device 18 to place the engine in the cranking disabled state.

As discussed above, according to the present embodiment, the locking and unlocking of the door locks as well as the setting and unsetting of the security of the vehicle can be automatically executed just by carrying the portable device 1 because of the above described functions of the smart key system.

Figure 2:
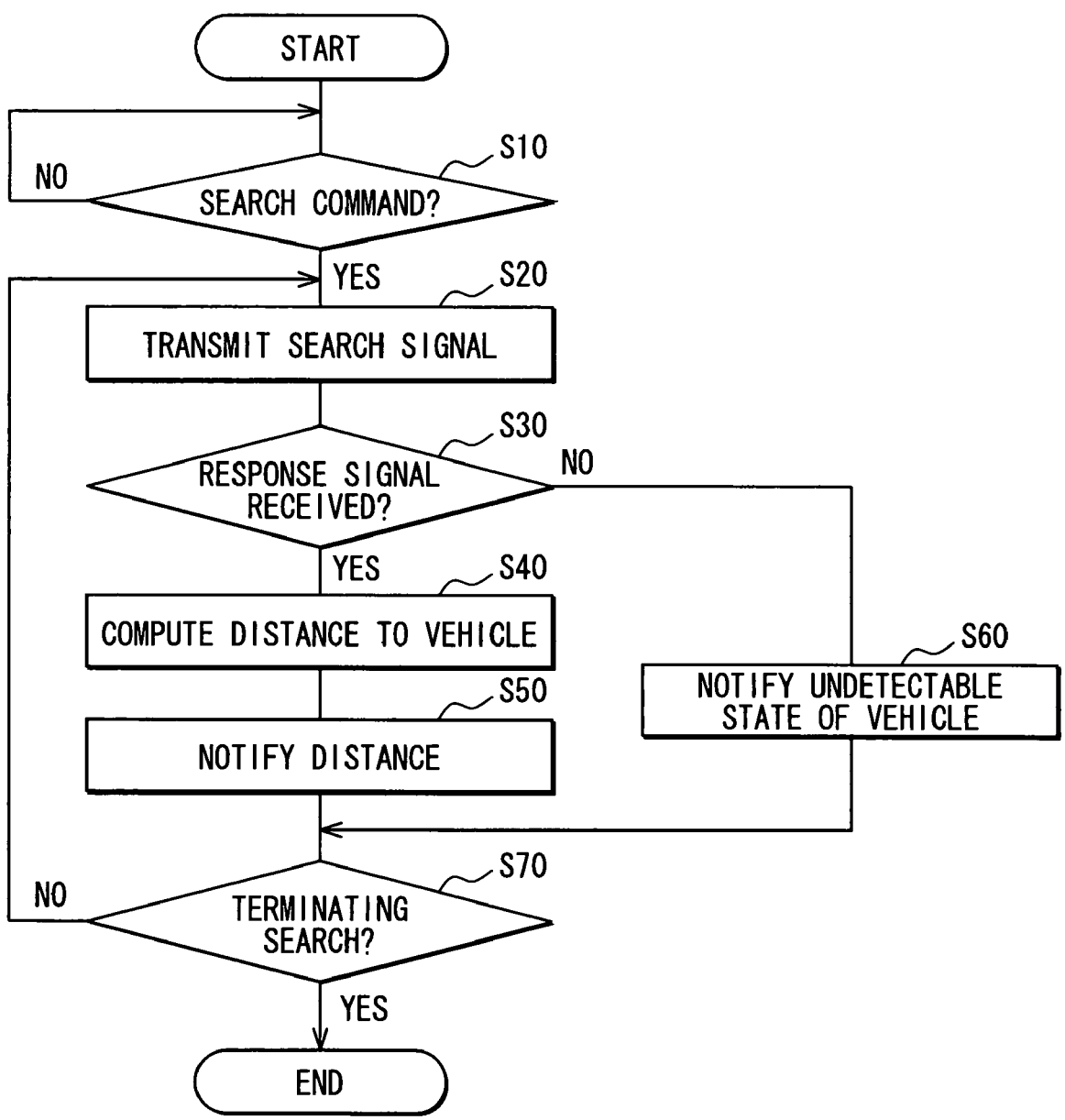
FIG. 2 is a flowchart showing a process executed by a portable device of the vehicle location information notifying system to notify a distance from the portable device to a vehicle as vehicle location information according to the first embodiment.

Next, the process, which is executed by the portable device 1 to notify the distance from the portable device 1 to the vehicle 10 as the vehicle location information, will be described with reference to FIG. 2.

First, at step S10, it is determined whether the carrier of the portable device 1 has commanded the searching of the vehicle location. At this determination step, when it is determined that the searching of the vehicle location has been commanded by the carrier, the operation proceeds to step S20. At step S20, the vehicle search signal, which includes the ID code of the portable device 1, is transmitted from the portable device 1. At this time, the single transmission power of the transmitter 3 of the portable device 1 is increased, so that the transmittable range of the vehicle search signal is increased. Therefore, even when the vehicle 10 is remote from the portable device 1, the vehicle side communication unit can receive the vehicle search signal.

When the vehicle side communication unit receives the vehicle search signal, the vehicle side communication unit verifies the ID code, which is contained in the received vehicle search signal, with the registered ID code. When the ID code, which is contained in the received vehicle search signal, is determined to be valid, the vehicle side response signal is transmitted from the transmitter 11 of the vehicle side communication unit to the portable device 1. At the time of transmitting the vehicle side response signal, the signal transmission power of the transmitter 11 is increased.

Then, at step S30, it is determined whether the vehicle side response signal, which is transmitted from the vehicle side transmission unit, is received. At this determination step S30, when it is determined that the vehicle side response signal is received, the operation proceeds to step S40. At step S40, an approximate distance from the portable device 1 to the vehicle 10 is computed based on the signal level of the received vehicle side response signal. Then, at step S50, the computed distance is notified to the carrier of the portable device 1 through the notifying device 5.

In contrast, when it is determined that the vehicle side response signal is not received at step S30, the operation proceeds to step S60. At step S60, it is notified to the carrier of the portable device 1 that the vehicle 10 is not sensed, i.e., is undetectable in the communication area of the first intercommunication. In such a case, the notification sound of some kind may be generated at the notifying device 5 to notify that the vehicle 10 is not sensed. Alternatively, the notifying device 5 may use any other means to notify that the vehicle is not sensed.

At step S70, it is determined whether a condition for terminating the searching of the vehicle location is satisfied. The condition for terminating the searching of the vehicle location may be satisfied when the distance from the portable device 1 to the vehicle 10 is notified to the carrier of the portable device 1. Alternatively, the condition for terminating the searching of the vehicle location may be satisfied when the vehicle search signal has been transmitted a predetermined number of times. Further alternatively, the condition for terminating the searching of the vehicle location may be satisfied when the carrier of the portable device 1 commands the termination of the searching of the vehicle location. When it is determined that the condition for terminating the searching of the vehicle location is satisfied at step S70, the searching of the vehicle location is terminated. In contrast, when it is determined that the condition for terminating the searching of the vehicle location is not satisfied at step S70, the operation returns to step S20 and repeats the following steps.

As described above, in the vehicle location information notifying system of the present embodiment, the distance to the vehicle 10 can be notified to the carrier, i.e., the user through use of the portable device 1 of the smart key system. Thus, the user does not need to carry any other portable device other than the portable device 1 of the smart key system. The carrier of the portable device 1 can know the approximate distance to the vehicle 10, so that the carrier of the portable device 1 can more easily find the vehicle 10.

Second Embodiment

Next, the vehicle location information notifying system according to a second embodiment of the present invention will be described. In the vehicle location information notifying system of the present embodiment, each of the portable device 1 and the vehicle 10 has its own GPS receiver for sensing its location. The second embodiment differs from the first embodiment in that portable device 1 and the vehicle 10 exchange its location information through the first intercommunication.

The structure of the vehicle location information notifying system of the second embodiment will be described with reference to FIG. 3. In the following description, components similar to those of the vehicle location information notifying system of the first embodiment will be indicated by the same numerals and will not be described further for the sake of simplicity.

Figure 3:
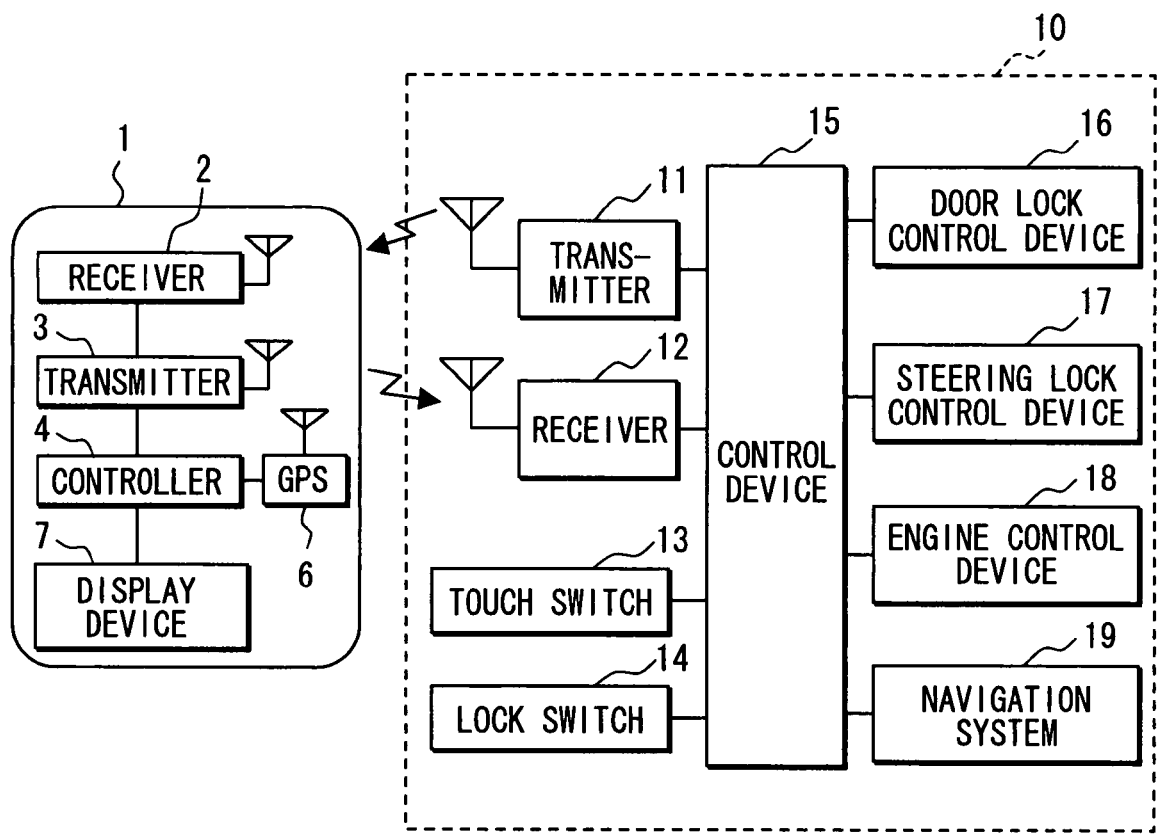
FIG. 3 is a schematic diagram showing an entire structure of a vehicle location information notifying system according to a second embodiment of the present invention.

As shown in FIG. 3, the portable device 1 includes a GPS receiver 6 and a display device 7 in addition to the receiver 2, the transmitter 3 and the controller 4. As is well known in the art, the GPS receiver 6 receives GPS signals from multiple GPS satellites, which periodically transmit navigation data, such as GPS orbit information, time information, which is required for the positioning. The GPS signals, which are received by the GPS receiver 6, are transmitted to the controller 4. Then, the controller 4 computes the location (the latitude, the longitude) of the portable device 1 based on the GPS signals.

The display device 7 is, for example, a liquid crystal display and displays the distance from the portable device 1 to the vehicle 10 and the azimuth of the vehicle 10 relative to the portable device 1. A map database, which stores map data, may be provided to the portable device 1, and a map, which is retrieved from the map database, may be displayed on the display device 7. Also, at this time, the location of the vehicle may be displayed on the map.

The vehicle 10 is equipped with a navigation system 19. As is well known in the art, the navigation system 19 includes a position sensing device, such as the GPS receiver, which senses the current location of the vehicle 10 and a traveling direction of the vehicle 10. A display device (not shown) of the navigation system 19 displays a map image, which shows a map around the vehicle as well as the current location and the traveling direction of the vehicle, and the navigation system 19 provides the guidance to a destination along a corresponding route upon setting of the destination.

Figure 4:
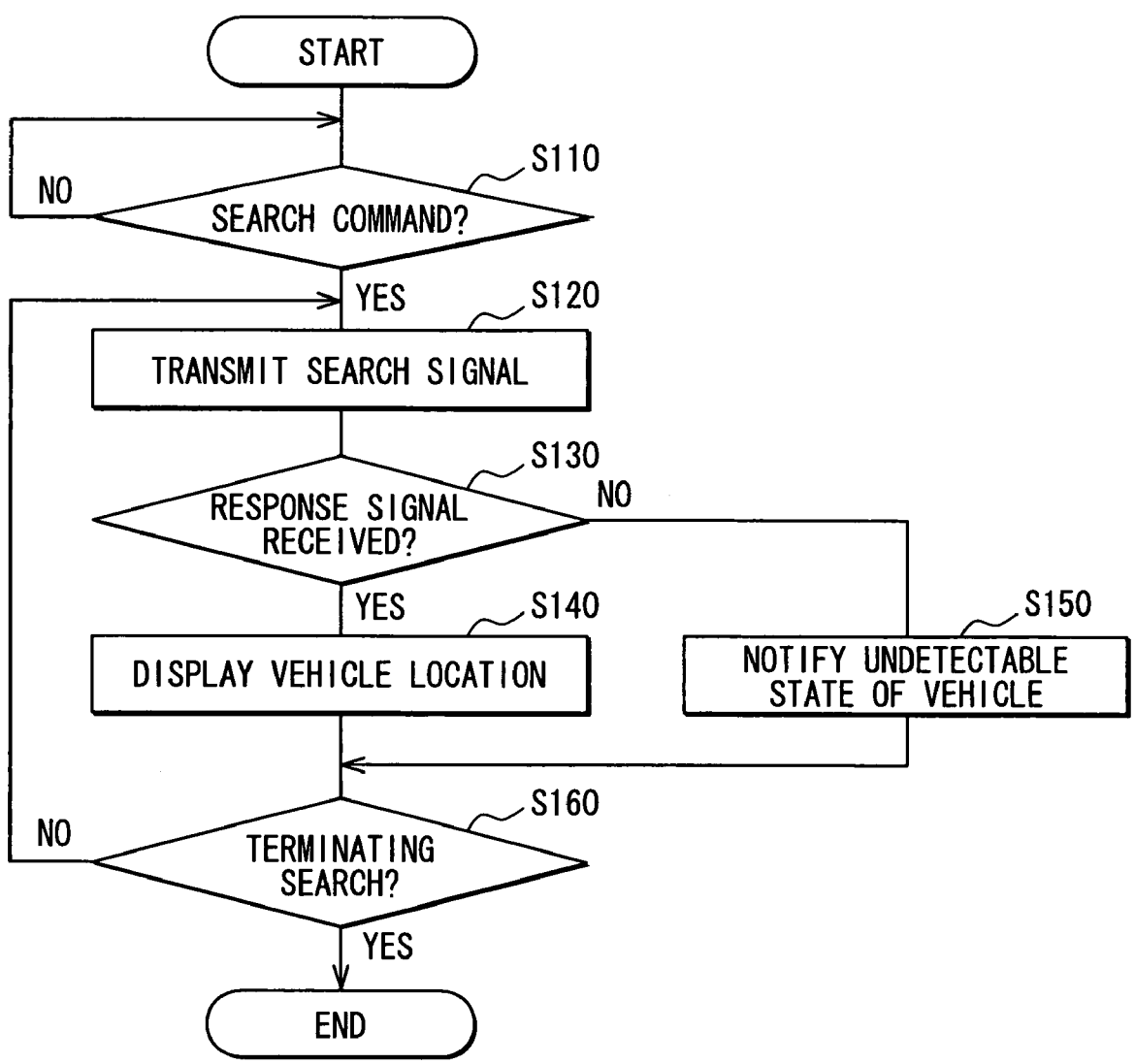
FIG. 4 is a flowchart showing a process executed by a portable device of the vehicle location information notifying system to display vehicle location information according to the second embodiment.

A process, which is executed by the portable device 1 to display the vehicle location information, will be described with reference to a flowchart shown in FIG. 4.

First, at step S110, like in the first embodiment, it is determined whether the carrier of the portable device 1 has commanded the searching of the vehicle location. At this determination step, when it is determined that the searching of the vehicle location has been commanded by the carrier, the operation proceeds to step S120. At step S120, the vehicle search signal is transmitted from the portable device 1. Here, unlike the first embodiment, the vehicle search signal contains the location information of the portable device 1 in addition to the ID code of the portable device 1. When the vehicle search signal, which includes the location information, is transmitted from the portable device 1 to the vehicle side communication unit, the location of carrier of the portable device 1 may be displayed on the display device of the navigation system 19 at the vehicle 10.

Specifically, the informed location of the portable device 1 may be displayed on the map display screen on the display device of the navigation system 19. In this way, another occupant who is left in the vehicle 10 or a user of the vehicle 10 can accurately recognize the carrier of the portable device 1 who is apart from the vehicle 10.

When the vehicle side communication unit receives the vehicle search signal, similar to the first embodiment, the vehicle side communication unit verifies the ID code, which is contained in the received vehicle search signal, with the registered ID code. When the ID code, which is contained in the received vehicle search signal, is determined to be valid, the vehicle side response signal is transmitted from the transmitter 11 of the vehicle side communication unit to the portable device 1. The vehicle side response signal includes the location information of the vehicle 10 as described above.

Then, at step S130, it is determined whether the vehicle side response signal, which is transmitted from the vehicle side transmission unit, is received. At this determination step S130, when it is determined that the vehicle side response signal is received, the operation proceeds to step S140. At step S140, the vehicle location is displayed on the display device 7 based on the vehicle location information contained in the vehicle side response signal.

For example, the controller 4 of the portable device may compute the distance from the portable device 1 to the vehicle 10 and the azimuth of the vehicle 10 relative to the portable device 1 based on the current location of the vehicle 10 and the current location of the portable device 1. Then, the controller 4 may display the distance of the vehicle 10 and the azimuth of the vehicle 10 on the display device 7. Alternatively, as discussed above, in the case where the portable device 1 includes the map database, the map may be displayed on the display device 7, and the location of the vehicle may be displayed on the map display screen on the display device 7. With this displaying, the carrier of the portable device 1 can easily know the accurate location of the vehicle 10.

In contrast, when it is determined that the vehicle side response signal is not received at step S130, the operation proceeds to step S150. At step S150, it is notified to the carrier of the portable device 1 that the vehicle 10 is not sensed, i.e., is undetectable in the communication area of the first intercommunication.

At step S160, it is determined whether a condition for terminating the searching of the vehicle location is satisfied. When it is determined that the condition for terminating the searching of the vehicle location is satisfied at step S160, the searching of the vehicle location is terminated. In contrast, when it is determined that the condition for terminating the searching of the vehicle location is not satisfied at step S160, the operation returns to step S120 and repeats the following steps.

The present invention is not limited to the first and second embodiments, and these embodiments may be modified in various ways without departing from the scope and spirit of the invention.

For example, in the first embodiment, the approximate distance from the portable device to the vehicle 10 is notified through use of the sound, the light or the vibration. Voice (e.g., a synthetic voice generator) or a display device may be used to notify the approximate distance from the portable device 1 to the vehicle 10 through use of digits (the distance in a numeric value), which would be read by synthetic voice generated from the synthetic voice generator or would be displayed by the display device.

In the second embodiment, when the carrier of the portable device 1 command the searching of the vehicle location, the first intercommunication is performed between the portable device 1 and the vehicle side communication unit to exchange the location information. Alternatively, the portable device 1 and the vehicle side communication unit may be configured to permit the user who is left in the vehicle 10 to command the portable device 1 to perform the searching of the location information of the portable device 1. When this search operation is commanded by the user left in the vehicle 10, the first intercommunication may be performed between the portable device 1 and the vehicle side communication unit to exchange the location information.

Additional advantages and modifications will readily occur to those skilled in the art. The invention in its broader terms is therefore not limited to the specific details, representative apparatus, and illustrative examples shown and described.

What is claimed is:

1. A vehicle location information notifying system comprising:
    a vehicle side communication unit that is installed in a vehicle; and
    a portable device that is carriable by a user and performs first intercommunication with the vehicle side communication unit, wherein the portable device includes:
    a location information obtaining means for obtaining location information of the vehicle, which has the vehicle side communication unit, through the first intercommunication; and
    a notifying means for notifying the location information of the vehicle,
    wherein when the vehicle is parked, the vehicle side communication unit and the portable device perform second intercommunication therebetween such that the vehicle side communication unit periodically transmits a request signal to a predetermined area around the vehicle, and the portable device replies a response signal, which includes an ID code of the portable device, in response to the request signal; and
    a door lock control means for controlling locking and unlocking of a door lock of the vehicle based on a result of verification of the ID code, which is received by the vehicle side communication unit through the second intercommunication, with a preregistered code of the ID code, wherein when the vehicle side communication unit and the portable device perform the first intercommunication therebetween, each of the vehicle side communication unit and the portable device increases a signal transmission power thereof in comparison to the signal transmission power thereof used in the second intercommunication.

2. The vehicle location information notifying system according to claim 1, wherein the location information obtaining means obtains at least a distance from the portable device to the vehicle as the location information of the vehicle based on a signal level of a received signal, which is transmitted from the vehicle side communication unit through the first intercommunication.

3. The vehicle location information notifying system according to claim 2, wherein the notifying means notifies the distance from the portable device to the vehicle by one of sound, light and vibration.

4. The vehicle location information notifying system according claim 1, wherein the portable device and the vehicle side communication unit perform the first intercommunication when one of the portable device and the vehicle side communication unit receives a command from the user to start the first intercommunication.

5. The vehicle location information notifying system according to claim 1, further comprising a vehicle side position sensing means for sensing a location of the vehicle as the location information of the vehicle, wherein:
    the vehicle side position sensing means is provided in the vehicle;
    the vehicle side communication unit transmits the location information, which indicates the location of the vehicle sensed with the vehicle side position sensing means, to the portable device through the first intercommunication; and
    the location information obtaining means obtains the location information of the vehicle, which is transmitted from the vehicle side communication unit.

6. The vehicle location information notifying system according to claim 5, wherein the notifying means includes a displaying means for displaying the location of the vehicle on a map, which is displayed by the displaying means, based on the location information of the vehicle, which is obtained through the location information obtaining means.

7. The vehicle location information notifying system according to claim 5, wherein:
    the portable device further includes a portable device side position sensing means for sensing a location of the portable device as location information of the portable device;
    the portable device transmits the location information of the portable device, which is sensed with the portable device side position sensing means, to the vehicle side communication unit through the first intercommunication;
    the vehicle location information notifying system further comprising a vehicle side displaying means for displaying the location information of the portable device, which is received through the vehicle side communication unit; and
    the vehicle side displaying means is provided in the vehicle.

8. A vehicle location information notifying system comprising:
    a vehicle side communication unit that is installed in a vehicle;
    a portable device that is carriable by a user and performs first intercommunication with the vehicle side communication unit, wherein the portable device includes:
    a location information obtaining means for obtaining location information of the vehicle, which has the vehicle side communication unit, through the first intercommunication;
    a notifying means for notifying the location information of the vehicle; and a portable device side position sensing means for sensing a location of the portable device as location information of the portable device, wherein the portable device transmits the location information of the portable device, which is sensed with the portable device side position sensing means, to the vehicle side communication unit through the first intercommunication;

a vehicle side position sensing means for sensing a location of the vehicle as the location information of the vehicle; and a vehicle side displaying means for displaying the location information of the portable device, which is received through the vehicle side communication unit, wherein:

the vehicle side position sensing means and the vehicle side displaying means are provided in the vehicle;

the vehicle side communication unit transmits the location information, which indicates the location of the vehicle sensed with the vehicle side position sensing means, to the portable device through the first intercommunication; and the location information obtaining means obtains the location information of the vehicle, which is transmitted from the vehicle side communication unit.

9. The vehicle location information notifying system according to claim 8, wherein the location information obtaining means obtains at least a distance from the portable device to the vehicle as the location information of the vehicle based on a signal level of a received signal, which is transmitted from the vehicle side communication unit through the first intercommunication.

10. The vehicle location information notifying system according to claim 9, wherein the notifying means notifies the distance from the portable device to the vehicle by one of sound, light and vibration.

11. The vehicle location information notifying system according to claim 8, wherein the notifying means includes a displaying means for displaying the location of the vehicle on a map, which is displayed by the displaying means, based on the location information of the vehicle, which is obtained through the location information obtaining means.

12. The vehicle location information notifying system according claim 8, wherein the portable device and the vehicle side communication unit perform the first intercommunication when one of the portable device and the vehicle side communication unit receives a command from the user to start the first intercommunication.

13. A method of notifying vehicle location information utilizing a system having a vehicle side communication unit installed in a vehicle and a portable device carriable by a user, the method comprising:

performing a first intercommunication between the vehicle side communication unit and the portable device;

obtaining, in the portable device, location information of the vehicle having the vehicle side communication unit, through the first intercommunication;

notifying the location information of the vehicle;

performing, when the vehicle is parked, a second intercommunication between the vehicle side communication unit and the portable device such that the vehicle side communication unit periodically transmits a request signal to a predetermined area around the vehicle, and the portable device replies a response signal, which includes an ID code of the portable device, in response to the request signal; and controlling locking and unlocking of a door lock of the vehicle based on a result of verification of the ID code, which is received by the vehicle side communication unit through the second intercommunication, with a pre-registered code of the ID code;

wherein when the vehicle side communication unit and the portable device perform the first intercommunication therebetween, each of the vehicle side communication unit and the portable device has an increased a signal transmission power thereof in comparison to the signal transmission power thereof used in the second intercommunication.

14. The method according to claim 13, wherein at least a distance from the portable device to the vehicle is included in the location information of the vehicle based on a signal level of a received signal, which is transmitted from the vehicle side communication unit through the first intercommunication.

15. The method according to claim 13, further comprising:

sensing a location of the vehicle as the location information of the vehicle using a vehicle side position sensor provided in the vehicle;

transmitting the location information, which indicates the location of the vehicle sensed using the vehicle side position sensor, to the portable device through the first intercommunication; and obtaining the location information of the vehicle, which is transmitted from the vehicle side communication unit.

16. The method according to claim 13, wherein the notifying is achieved by a displaying the location of the vehicle on a map, which is displayed by a display on the portable device, based on the location information of the vehicle.

17. The method according to claim 13, wherein the portable device and the vehicle side communication unit perform the first intercommunication when one of the portable device and the vehicle side communication unit receives a command from the user to start the first intercommunication.

18. A method of notifying vehicle location information utilizing a system having a vehicle side communication unit installed in a vehicle and a portable device carriable by a user, the method comprising:

performing a first intercommunication between the vehicle side communication unit and the portable device;

obtaining, in the portable device, location information of the vehicle having the vehicle side communication unit, through the first intercommunication;

notifying the location information of the vehicle;

sensing a location of the vehicle as the location information of the vehicle using a vehicle side position sensor provided in the vehicle;

transmitting the location information, which indicates the location of the vehicle sensed with the vehicle side position sensor, from the vehicle side communication unit to the portable device through the first intercommunication; and sensing a location of the portable device as location information of the portable device using a portable device side position sensor;

transmitting the location information of the portable device, which is sensed with the portable device side position sensor, from the portable device to the vehicle side communication unit through the first intercommunication;

displaying the location information of the portable device, which is received through the vehicle side communication unit, on a vehicle side display provided in the vehicle.

* * * * *